United States Patent
Chen et al.

(10) Patent No.: US 11,339,316 B1
(45) Date of Patent: May 24, 2022

(54) METHOD AND DEVICE FOR PREPARING GRAPHENE-BASED POLYETHYLENE GLYCOL PHASE CHANGE MATERIAL

(71) Applicant: GUANGDONG UNIVERSITY OF TECHNOLOGY, Guangzhou (CN)

(72) Inventors: Yun Chen, Guangzhou (CN); Xiangyuan Luo, Guangzhou (CN); Shuquan Ding, Guangzhou (CN); Canguang Lin, Guangzhou (CN); Zengguang Gao, Guangzhou (CN); Xin Chen, Guangzhou (CN); Xun Chen, Guangzhou (CN); Jian Gao, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/559,112

(22) Filed: Dec. 22, 2021

(30) Foreign Application Priority Data

Dec. 24, 2020 (CN) .......................... 202011556014.3

(51) Int. Cl.
*C09K 5/06* (2006.01)
*C08K 3/04* (2006.01)
(Continued)

(52) U.S. Cl.
CPC .................. *C09K 5/06* (2013.01); *C08J 9/40* (2013.01); *C08K 3/04* (2013.01); *C08K 9/12* (2013.01); *C08J 2375/04* (2013.01)

(58) Field of Classification Search
None
See application file for complete search history.

(56) References Cited

U.S. PATENT DOCUMENTS

2021/0017436 A1* 1/2021 Guo .......................... C09K 5/06

FOREIGN PATENT DOCUMENTS

| CN | 103332686 A | 10/2013 |
| CN | 105112021 A | 12/2015 |

(Continued)

OTHER PUBLICATIONS

English abstract of CN 107057026 A, Aug. 18, 2017, China.*

(Continued)

*Primary Examiner* — Tae H Yoon

(57) ABSTRACT

A method and device for preparing a graphene-based polyethylene glycol phase change material. The method includes: (S1) dispersing carbon black in deionized water to form a carbon black dispersion; immersing polyurethane sponge in the carbon black dispersion; and taking out polyurethane sponge followed by drying to obtain a polyurethane sponge-carbon black combination; (S2) subjecting the polyurethane sponge-carbon black combination to a first electrical discharge machining to obtain a first intermediate; (S3) ultrasonically mixing the first intermediate, polyethylene glycol, and MgO to obtain a second intermediate; (S4) subjecting the second intermediate to a second electrical discharge machining to obtain a third intermediate; (S5) subjecting the third intermediate to acid washing to obtain a fourth intermediate, and drying the fourth intermediate; (S6) injecting polyethylene glycol into the fourth intermediate followed by stirring in a mold and drying to prepare the graphene-based polyethylene glycol phase change material.

4 Claims, 2 Drawing Sheets

(51) Int. Cl.
*C08K 9/12* (2006.01)
*C08J 9/40* (2006.01)

(56) References Cited

FOREIGN PATENT DOCUMENTS

| CN | 106118610 A | 11/2016 |
| CN | 107674652 A | 2/2018 |
| CN | 108822805 A | 11/2018 |
| CN | 109554164 A | 4/2019 |
| CN | 110655910 A | 1/2020 |
| CN | 110980704 A | 4/2020 |

OTHER PUBLICATIONS

English abstract of CN 109251276 A, Jan. 22, 2019, China.*
English abstractor CN 109554164 A A, Apr. 2, 2019, China.*

Fu Lei, Wang Zhong, Chen Ligui, Jia Shikui and Zhang Xianyong; Influence of preparation method on thermal property of PEG/graphene composite phase change material; Mar. 15, 2018; School of Materials Science and Engineering, Shaanxi University of Technology, Hanzhong 723000.

Wang Jingjing, Xu Xiaoliang, Liang Kaiyan and Wang Ge; Thermal conductivity enhancement of porous shape-stabilized composite phase change materials for thermal energy storage applications: a review; Jan. 15, 2020; School of Materials Science and Engineering, University of Science and Technology Beijing, Beijing 100083, China.

Wang Chengjun, Su Qiong, Duan Zhiying, Wang Aijun and Wang Zhichao; Research progress of shape-stable composite phase change energy storage materials based on porous supports; Jul. 20, 2020; School of Chemical Engineering, Northwest Minzu University, Lanzhou 730030, Gansu, China.

* cited by examiner

METHOD AND DEVICE FOR PREPARING GRAPHENE-BASED POLYETHYLENE GLYCOL PHASE CHANGE MATERIAL

CROSS-REFERENCE TO RELATED APPLICATIONS

This application claims the benefit of priority from Chinese Patent Application No. 202011556014.3, filed on Dec. 24, 2020. The content of the aforementioned application, including any intervening amendments thereto, is incorporated herein by reference in its entirety.

TECHNICAL FIELD

The present application relates to preparation for porous materials, and more particularly to a method and device for preparing a graphene-based polyethylene glycol phase change material.

BACKGROUND

Phase change materials are widely used in the fields of large-scale thermal management and latent heat of phase transformation. The phase change material refers to a class of substances that can change the physical state and provide latent heat under the constant temperature. The process of changing the physical state is called the phase change process, in which the phase change material will absorb or release a large amount of latent heat. Due to the high storage density and isothermal characteristics, the phase change material is considered to be effective to enable the latent heat storage, and has the potential to be applied to the thermal management of the electronic device to significantly extend the service life. Among the carbon materials, graphene, as a typical two-dimensional material, has a perfect large π-conjugated system and the smallest monoatomic layer thickness, and is thus considered as an ideal filling material for multifunctional polymers and possesses a promising application prospect in the fields of electrical device, intelligent material, energy storage and composite material. Polyethylene glycol possesses many superior characteristics, including high phase change enthalpy, excellent chemical and thermal stability, good biodegradability, low vapor pressure and appropriate melting temperature, and is free of toxicity and corrosivity. As a result, a graphene nanosheet-polyethylene glycol composite, in which the excellent performances of the two components are combined, is considered as an ideal organic phase change material.

However, the simple stacking or mixing of the graphene filler and polyethylene glycol fails to make full use of their excellent performances. Currently, the three-dimensional graphene framework is mainly prepared by gel expansion or chemical vapor deposition. Regarding the gel expansion method, a crosslinker is required, such that the thermal property and electrical property of the graphene framework is attenuated and its application is limited. The chemical vapor deposition method requires copper or nickel as a self-sacrificing template to grow graphene on a framework of the metal template. The metal template is removed by subsequent acid etching, but this process will easily cause the graphene to loss the attachment, destroying the three-dimensional structure of the graphene. Chinese patent application publication No. 109232013A discloses a method for preparing a graphene framework, where a large number of microbubbles are introduced by stirring, and the reaction system is subjected to thermal reduction reaction, frozen, unfrozen at a high temperature, and dried to obtain a large-size foam sheet containing the graphene framework. Chinese patent application publication No. 104291324A discloses another preparation method, in which the graphene oxide coated on the nickel foam is reduced in a solution, then the nickel template is removed by metal corrosion to obtain the graphene framework. Although these methods are expected to obtain graphene framework materials with a desired structure, they still fail to enable the high-efficiency, low-cost and simple preparation of a three-dimensional graphene framework with high stability. As a consequence, it is urgently required to develop a fast and cost-effective method for preparing the large-area graphene framework and apply the graphene framework to enhance the performance of graphene-based phase change materials.

SUMMARY

In view of the defects of low production efficiency, poor stability and serious environmental pollution in the existing preparation of graphene-based polyethylene glycol phase change materials, an object of this disclosure is to provide a method for preparing a graphene-based polyethylene glycol phase change material to enable the efficient, cost-effective, highly-stable, simple and secondary pollution-free preparation.

Another object of this disclosure is to provide a simply-structured device for preparing the graphene-based polyethylene glycol phase change material to realize the fast, efficient and large-scale preparation.

Technical solutions of the disclosure are described as follows.

In a first aspect, the present disclosure provides a method for preparing a graphene-based polyethylene glycol phase change material, comprising:

(S1) dispersing carbon black in deionized water to form a carbon black dispersion; immersing polyurethane sponge in the carbon black dispersion; and taking out the polyurethane sponge followed by drying to obtain a polyurethane sponge-carbon black combination;

(S2) subjecting the polyurethane sponge-carbon black combination to a first electrical discharge machining to obtain a first intermediate;

(S3) ultrasonically mixing the first intermediate, polyethylene glycol, and MgO to obtain a second intermediate;

(S4) subjecting the second intermediate to a second electrical discharge machining to obtain a third intermediate;

(S5) subjecting the third intermediate to acid washing to obtain a fourth intermediate, and drying the fourth intermediate;

(S6) injecting polyethylene glycol into the fourth intermediate followed by stirring in a mold and drying to prepare the graphene-based polyethylene glycol phase change material.

In an embodiment, in step (S1), a concentration of the carbon black in the carbon black dispersion is 1-5 mg/mL.

In an embodiment, in step (S2), the first electrical discharge machining is performed in an argon atmosphere at a discharge voltage of 100-300 V and a discharge capacitance of 100-300 mF.

In an embodiment, in step (S3), an ultrasonic mixing of the first intermediate, polyethylene glycol, and MgO is performed through steps of:

(S31) ultrasonically mixing MgO and polyethylene glycol for 5-20 min to obtain a mixture of MgO and polyethylene glycol; and (S32) injecting the mixture of MgO and polyethylene glycol into the first intermediate followed by ultrasonic mixing for 5-10 min to obtain the second intermediate.

In an embodiment, in step (S31), a weight ratio of MgO to polyethylene glycol is 1:(5-10);

In an embodiment, in step (S32), a weight ratio of the mixture of MgO and polyethylene glycol to the first intermediate is 1:(0.3-0.5).

In an embodiment, in step (S4), the second electrical discharge machining is performed in an air atmosphere at a discharge voltage of 200-400 V and a discharge capacitance of 150-360 mF.

In an embodiment, in step (S5), the acid washing of the third intermediate is performed using a dilute hydrochloric acid with a concentration of 2-2.5 mol/L.

In an embodiment, in step (S6), the drying is performed though a step of: drying the fourth intermediate injected with polyethylene glycol to a constant weight at 50-70° C. in a vacuum oven.

In an embodiment, in step (S6), a weight ratio of the fourth intermediate to polyethylene glycol is 1:(5-15).

In a second aspect, the present disclosure provides a device for preparing a graphene-based polyethylene glycol phase change material to implement the above method, comprising:

a discharge chamber;
an electric cabinet; and
a controller;
wherein a quartz tube is provided in the discharge chamber; and two ends of the quartz tube are respectively provided with an electrode;

a charging power supply and a capacitor bank are provided in the electric cabinet; the capacitor bank is electrically connected with the electrode; the charging power supply is electrically connected with the electric cabinet; and the controller is electrically connected with the charging power supply; and the discharge chamber is connected to a vacuum pump and an air feeding device.

Compared with the prior art, this application has the following beneficial effects.

1. By means of the method provided herein for preparing a graphene-based polyethylene glycol phase change material, the polyurethane sponge and carbon black can be converted into graphene sheet in situ with low cost and simple process.

2. By means of the instantaneous electrical discharge machining, a strong interface is built between the graphene framework and polyethylene glycol in the phase change material. An elastic porous three-dimensional graphene framework with a large number of micropores is produced through the second electrical discharge machining, and the porous structure allows polyethylene glycol (polymer) to fully enter and fill, such that the graphene framework is fully bonded with the polymer. In addition, the polyethylene glycol in contact with the three-dimensional graphene framework is converted into graphene nanosheet in the second electrical discharge machining, which acts as a medium to make the unconverted polyethylene glycol and graphene framework firmly bonded by virtue of van der Waals force.

3. By means of the instantaneous electrical discharge machining, the agglomeration of the graphene nanosheet can be effectively inhibited. Considering that graphene is a two-dimensional material with large specific surface area and van der Waals force widely exists between the layers of graphene nanosheet, the incorporation of graphene into the polymer is often performed by stirring or ultrasonic dispersion in the existing technologies, which has difficulty in fully overcoming the van der Waals force. In the method provided herein, the three-dimensional framework is a common framework of graphene and graphite carbon, and acts as a conducting substance in the second electrical discharge machining. The charge moves along the network of the common framework to generate a great impact force (Coulomb force) instantaneously. The Coulomb force can overcome the action of van der Waals force, which causes the agglomeration of graphene, to prevent the agglomeration. In addition, the three-dimensional graphene framework provides a structure for the graphene converted by polyethylene glycol to attach to, making it difficult for the graphene to agglomerate in other places.

4. Under the instantaneous high-temperature and high-pressure environment created by electrical discharge machining, a firm network containing elastic porous three-dimensional graphene framework and polyethylene glycol is formed. The graphene framework provides desirable thermal conductivity, such that the prepared graphene-based polyethylene glycol phase change material exhibits satisfactory shape stabilizing effect and phase change enthalpy in the tests of phase change temperature and latent heat, and can be used as an effective thermal management component in electronic products.

5. Due to the high efficiency of electrical discharge machining, the preparation time is shortened, and this preparation method is suitable for the industrial batch production.

6. Due to the introduction of the electrical discharge machining, the toxic agents are not necessary, which facilitates meeting the requirements of environmental protection, low cost, high efficiency, and sustainable development. This application provides an effective solution for the large-scale production of high-quality graphene-based polyethylene glycol phase change materials and even other filler-reinforced polymers.

BRIEF DESCRIPTION OF THE DRAWINGS

This application will be described in detail below with reference to the accompanying drawings, but presented in the drawings are not intended to limit the application.

Figure 1:
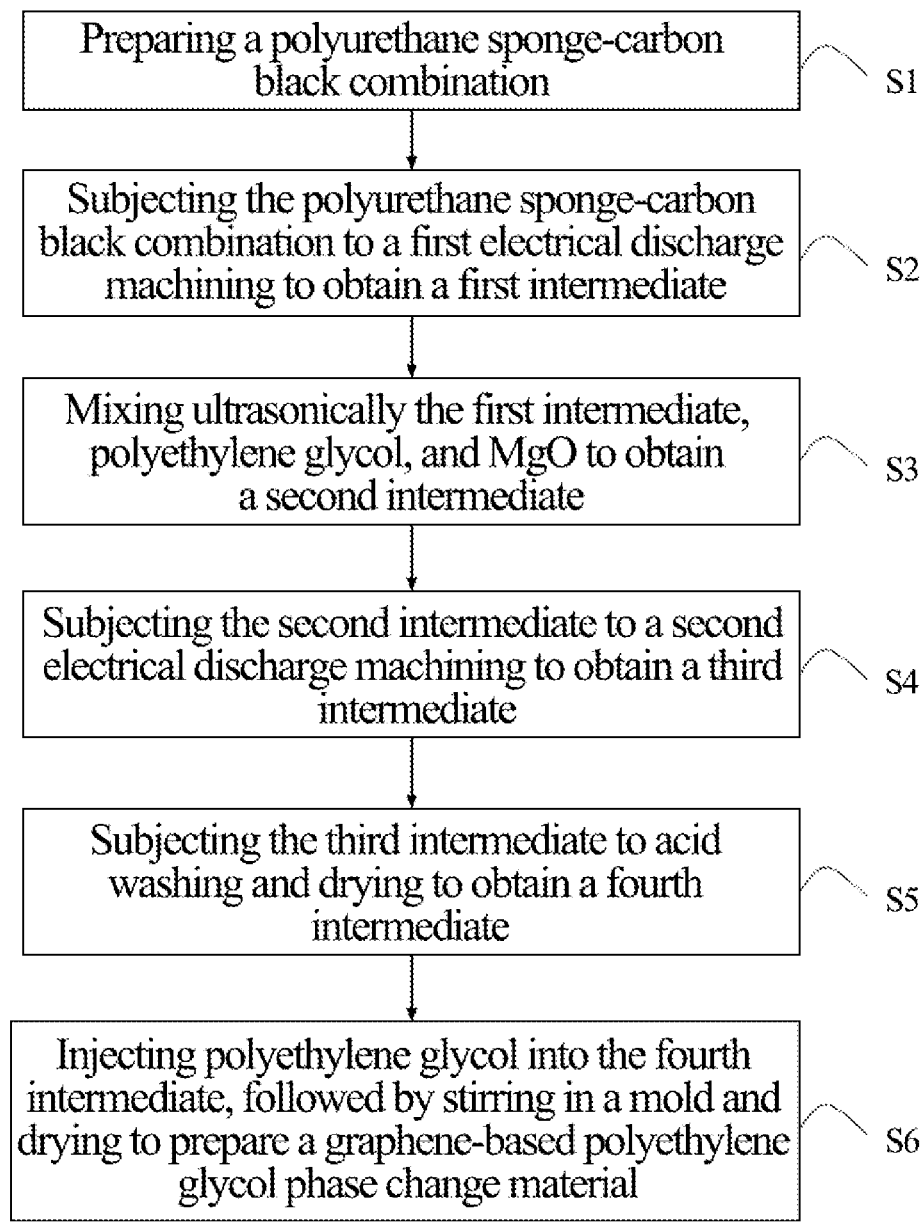
FIG. 1 is a flow chart of a method for preparing a graphene-based polyethylene glycol phase change material according to an embodiment of the disclosure.

In the drawings: 1: discharge chamber; 11: quartz tube; 111: discharge cavity; 12: electrode; 2: electric cabinet; 21: charging power supply; 22: capacitor bank; 3: controller; 4: vacuum pump; and 5: air feeding device.

DETAILED DESCRIPTION OF EMBODIMENTS

As shown in FIG. 1, a method for preparing a graphene-based polyethylene glycol phase change material is provided, which includes the following steps.

(S1) Carbon black is dispersed in deionized water to form a carbon black dispersion. Polyurethane sponge is immersed in the carbon black dispersion and then taken out and dried to obtain a polyurethane sponge-carbon black combination.

(S2) The polyurethane sponge-carbon black combination is subjected to a first electrical discharge machining to obtain a first intermediate.

(S3) The first intermediate, polyethylene glycol, and MgO are ultrasonically mixed to obtain a second intermediate.

(S4) The second intermediate is subjected to a second electrical discharge machining to obtain a third intermediate.

(S5) The third intermediate is subjected to acid washing and dried to obtain a fourth intermediate.

(S6) The fourth intermediate is injected with polyethylene glycol, stirred in a mold and dried to prepare the graphene-based polyethylene glycol phase change material.

Among the carbon materials, graphene, as a typical two-dimensional material, has a perfect large π-conjugated system and the smallest monoatomic layer thickness, and is thus considered as an ideal filling material for multifunctional polymers and possesses a promising application prospect in the fields of electrical device, intelligent material, energy storage and composite material. However, the simple stacking or mixing of the graphene filler and polyethylene glycol fails to make full use of their excellent performances. In order to fully utilize their functions, it is required to spatially stack graphene to form an ordered three-dimensional framework structure, and simultaneously form a highly-interconnected and ultra-low-density macroporous structure. The three-dimensional interconnected network constructed by graphene nanosheets can not only fully utilize the superior electrical, mechanical and thermal properties of graphene nanosheets, but also be used as an effective reinforcing agent in composite materials. By virtue of the high energy density and instantaneous operation, the electrical discharge machining provides an ideal solution for rapidly preparing highly-stable graphene framework and preventing the agglomeration of graphene nanosheets in a polymer.

By means of the precise electrical discharge machining, the disclosure realizes the fast and large-scale preparation of the graphene-based polyethylene glycol phase change material, and a firm bonding between the graphene framework and polyethylene glycol is effectively enabled. Moreover, the agglomeration of graphene nanosheets in the polymer is prevented. The disclosure realizes the high-efficiency, low-cost, high-stability, simple and secondary pollution-free preparation of the graphene-based polyethylene glycol phase change material. The specific advantages are described as follows.

1. By means of the method provided herein for preparing a graphene-based polyethylene glycol phase change material, the polyurethane sponge and carbon black can be converted into graphene sheet in situ with low cost and simple process.

2. By means of the instantaneous electrical discharge machining, a strong interface is built between the graphene framework and polyethylene glycol in the phase change material. An elastic porous three-dimensional graphene framework with a large number of micropores is produced through the second electrical discharge machining, and the porous structure allows polyethylene glycol (polymer) to fully enter and fill, such that the graphene framework is fully bonded with the polymer. In addition, the polyethylene glycol in contact with the three-dimensional graphene framework is converted into graphene nanosheet in the second electrical discharge machining, which acts as a medium to make the unconverted polyethylene glycol and graphene framework firmly bonded by virtue of van der Waals force.

3. By means of the instantaneous electrical discharge machining, the agglomeration of the graphene nanosheet can be effectively inhibited. Considering that graphene is a two-dimensional material with large specific surface area and van der Waals force widely exists between the layers of graphene nanosheet, the incorporation of graphene into the polymer is often performed by stirring or ultrasonic dispersion in the existing technologies, which has difficulty in fully overcoming van der Waals force. In the method provided herein, the three-dimensional framework is a common framework of graphene and graphite carbon, and acts as a conducting substance in the second electrical discharge machining. The charge moves along the network of the common framework to generate a great impact force (Coulomb force) instantaneously. The Coulomb force can overcome the action of van der Waals force, which causes agglomeration of graphene, to prevent the agglomeration. In addition, the three-dimensional graphene framework provides a structure for the graphene converted by polyethylene glycol to attach to, making it difficult for the graphene to agglomerate in other places.

4. Under the instantaneous high-temperature and high-pressure environment created by electrical discharge machining, a firm network containing elastic porous three-dimensional graphene framework and polyethylene glycol is formed. The graphene framework provides desirable thermal conductivity, such that the prepared graphene-based polyethylene glycol phase change material exhibits satisfactory shape stabilizing effect and phase change enthalpy in the tests of phase change temperature and latent heat, and can be used as an effective thermal management component in electronic products.

5. Due to the high efficiency of electrical discharge machining, the preparation time is shortened, and this preparation method is suitable for the industrial batch production.

6. Due to the introduction of the electrical discharge machining, the toxic agents are not necessary, which facilitates meeting the requirements of environmental protection, low cost, high efficiency, and sustainable development. This application provides an effective solution for the large-scale production of high-quality graphene-based polyethylene glycol phase change materials and even other filler-reinforced polymers with large area.

In this embodiment, in step (S1), a concentration of the carbon black in the carbon black dispersion is 1-5 mg/mL.

If the carbon black concentration in the carbon black dispersion is too low, it will lead to an insufficiency attachment of carbon black on the polyurethane sponge. If the carbon black concentration is too high, it will result in an excessive attachment of carbon black, which will further affect the conversion of the polyurethane sponge into graphene in the first electrical discharge machining.

In this embodiment, in step (S1), the polyurethane sponge is taken out and dried at 50-70° C. for 40-120 min.

If the drying temperature of the polyurethane sponge is too low, it will lead to incomplete evaporation of water. If the drying temperature is too high, it will cause the carbon black to fall off the polyurethane sponge easily, which will further affect the conversion of the polyurethane sponge into graphene in the first electrical discharge machining.

In this embodiment, in step (S2), the first electrical discharge machining is performed in an argon atmosphere at a discharge voltage of 100-300 V and a discharge capacitance of 100-300 mF.

In the first electrical discharge machining, the carbon black attached on the polyurethane sponge acts as a conducting substance, which instantaneously generates (within 5 seconds) a large amount of resistance heat (with a temperature above 3000K) and a high pressure (above 2.7 Gpa). The polyurethane sponge is completely carbonized and partially converted into the three-dimensional graphene framework in an argon atmosphere. The three-dimensional framework is the common framework of graphene and graphite carbon, i.e., the first intermediate. The framework structure allows a fast charge transfer and can act as a conducting substance in the second electrical discharge machining.

In this embodiment, in step (S3), an ultrasonic mixing of the first intermediate, polyethylene glycol, and MgO is performed through the following steps.

(S31) MgO and polyethylene glycol are ultrasonically mixed for 5-20 min to obtain a mixture of MgO and polyethylene glycol.

(S32) The first intermediate is injected with the mixture of MgO and polyethylene glycol and ultrasonically mixed for 5-10 min to obtain the second intermediate.

In this embodiment, MgO and polyethylene glycol are ultrasonically mixed for 5-20 min to realize the complete combination. The first intermediate is injected with the mixture of MgO and polyethylene glycol and then ultrasonically mixed for 5-10 min to obtain the second intermediate. The insufficient ultrasonic mixing will lead to uneven mixing. The excessive ultrasonic mixing may damage the three-dimensional graphene framework structure and reduce the processing efficiency.

The first intermediate, MgO and polyethylene glycol are ultrasonically mixed to realize the sufficient physical mixing, so as to prepare for the catalytic effect of MgO and the sufficient conversion of the polyethylene glycol layer near the graphene framework in the second electrical discharge machining.

In this embodiment, in step (S31), a weight ratio of MgO to polyethylene glycol is 1:(5-10).

In step (S32), a weight ratio of the mixture of MgO and polyethylene glycol to the first intermediate is 1:(0.3-0.5).

In step (S31), the weight ratio of MgO to polyethylene glycol is 1:(5-10). If the amount of MgO is too small, it will lead to an insufficient catalytic effect, and excessive MgO will cause that the MgO cannot be completely removed by the subsequent acid washing.

In step (S32), the weight ratio of the mixture of MgO and polyethylene glycol to the first intermediate is 1:(0.3-0.5). If the amount of the first intermediate is insufficient, it will lead to insufficient electrical conductivity in the second electrical discharge machining, and if the first intermediate is excessive, it will lead to excessive deformation of the three-dimensional framework by excessive compression in the second electrical discharge machining, affecting the formation of the final elastic porous structure.

In an embodiment, in step (S4), the second electrical discharge machining is performed in an air atmosphere at a discharge voltage of 200-400 V and a discharge capacitance of 150-360 mF.

In the second electrical machining, the common framework (three-dimensional framework) of graphene and graphite carbon produced in the first electrical discharge machining acts as a conductive frame to ensure the normal instantaneous electrical discharge machining, which instantaneously (within 5 seconds) generates a large amount of resistance heat (with a temperature above 3000K). In an embodiment, the second electrical discharge machining is directly carried out in an air atmosphere. The air contains many components, such as nitrogen, oxygen, which can be used as a natural etching agent. The second intermediate is subjected to selective instantaneous etching in the air and selective burning of low crystallinity carbon at 450-600° C. to produce an elastic porous structure. Specifically, the two reactions are completed within 5 seconds.

Firstly, a low crystallinity carbon is selectively burned at 450-600° C. The low-crystallinity carbon is derived from part of the carbonization product of polyurethane sponge in the first electric discharge machining, and has an elastic porous three-dimensional graphene framework with a plenty of micropores. The first electrical discharge machining generally does not convert the polyurethane sponge completely ed into graphene, and the remaining polyurethane sponge is completely converted into graphene in the second electrical discharge machining.

Secondly, in the second electrical discharge machining, during the instantaneous temperature-rise process above 600° C., MgO can catalyze the carbonization of polyethylene glycol in situ, and the carbonized product is peeled to form graphene nanosheets. The graphene nanosheets are concentrated on the interface between the elastic porous three-dimensional graphene framework and polyethylene glycol to construct a firm bonding force therebetween.

In this embodiment, only the polyethylene glycol in contact with the three-dimensional graphene framework is converted into graphene nanosheets. Different from the smooth surface of the three-dimensional graphene framework transformed from the polyurethane sponge, the graphene nanosheets transformed from polyethylene glycol have a wrinkled surface texture with curled edges, which plays a beneficial role in enhancing the interlocking between the sheets and strengthening the bonding force between the elastic porous three-dimensional graphene framework and polyethylene glycol.

In this embodiment, in step (S5), the acid washing of the third intermediate is performed using a dilute hydrochloric acid with a concentration of 2-2.5 mol/L.

The third intermediate is subjected to acid washing to remove the metal compound impurities, and a dilute hydrochloric acid with a concentration of 2-2.5 mol/L is adopted. If the concentration of dilute hydrochloric acid is too low, the impurities cannot be sufficiently removed, and if the hydrochloric acid concentration is too high, the third intermediate is prone to be corroded.

In this embodiment, in step (S5), the fourth intermediate is dried at 100-160° C.

If a drying temperature of the fourth intermediate is too low, the drying will be insufficient, and if the temperature is too high, the fourth intermediate is prone to be decomposed, affecting the performance of the prepared graphene-based polyethylene glycol phase change material.

In this embodiment, in step (S6), the drying is performed though a following step. The fourth intermediate is dried to a constant weight at 50-70° C. in a vacuum oven.

In step (S6), if a drying temperature is too low, the drying will be insufficient, and if the temperature is too high, the fourth intermediate is prone to be decomposed. The final product obtained in step (S6) is the graphene-based polyethylene glycol phase change material.

In this embodiment, in step (S6), the mold can be in different shapes according to the requirement of the user. The material of the mold is metal, resin or ceramic. And the mold is configured to prepare phase change materials in different shapes required by the user.

In this embodiment, in step (S6), a weight ratio of the fourth intermediate to polyethylene glycol is 1:(5-15).

In step (S6), if the amount of polyethylene glycol is insufficient or excessive, it will result in an undesirable latent heat storage performance of the final phase change material obtained.

In the final product of graphene-based polyethylene glycol phase change material, an elastic porous three-dimensional graphene framework with a large number of micropores not only acts as a support structure in the phase change material to stabilize the molten polyethylene glycol during the solid-liquid phase transition process, but also acts as a thermal conducting filler to improve thermal conductivity. Considering that the firm network containing elastic porous three-dimensional graphene framework and polyethylene glycol is formed, under the instantaneous high-temperature and high-pressure environment created by electrical discharge machining, the final product of graphene-based polyethylene glycol phase change material is tested in phase change temperature and latent heat. It exhibits good shape stabilization effect and phase change enthalpy, and can be used as an effective thermal management device in electronic products. The prepared graphene-based polyethylene glycol phase change material exhibits satisfactory shape stabilizing effect and phase change enthalpy in the tests of phase change temperature and latent heat, and can be used as an effective thermal management component in electronic products.

Figure 2:
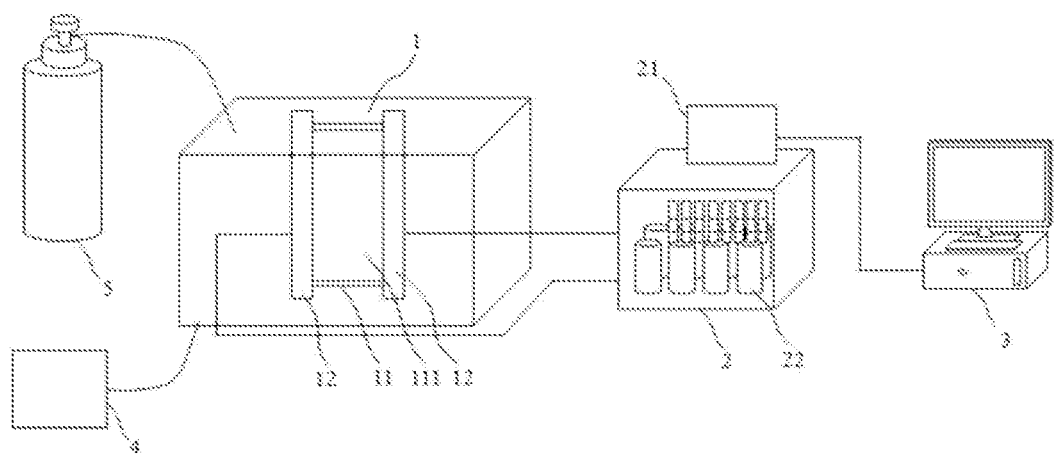
FIG. 2 is a structural diagram of a device for preparing the graphene-based polyethylene glycol phase change material according to an embodiment of the disclosure.

As shown in FIG. 2, a device for preparing the graphene-based polyethylene glycol phase change material is provided, which includes a discharge chamber 1, an electric cabinet 2, and a controller 3. A quartz tube 11 is provided in the discharge chamber 1. Two ends of the quartz tube 11 are respectively provided with an electrode 12.

A charging power supply 21 and a capacitor bank 22 are provided in the electric cabinet 2. The capacitor bank 22 is electrically connected with the electrode 12. The charging power supply 21 is electrically connected with the electric cabinet 22. The controller 3 is electrically connected with the charging power supply 21.

The discharge chamber 1 is connected to a vacuum pump 4 and an air feeding device 5.

In an embodiment, the charging power supply 21 is configured to charge the capacitor bank 22. The controller 3 is a computer. The controller 3 is configured to control the start and stop of the charging operation of the charging power supply 21, and control the discharge voltage and current. The vacuum pump 4 is configured to vacuumize the discharge chamber 1. The gas feeding device 5 is a gas cylinder. The gas feeding device 5 is configured to supply a process gas to the discharge chamber 1.

In this embodiment, the capacitor bank 22 includes two sets of capacitors, where one of the two sets of capacitors has a discharge capacitance of 36 mF, and the other of the two sets of capacitors has a discharge capacitance of 24 mF. During the electrical discharge machining, different capacitor combinations can be selected for discharge, such as a combination of "36+24", a combination of "36+24+24", or a combination of "36+36+36+36+36", and so on.

In an embodiment, prior to the first electrical discharge machining and the second electrical discharge machining, the sample is loaded and the controller 3 sets the target discharge voltage and capacitance value, so as to control the charging power supply 21 to charge the capacitor bank 22, and then the discharge cavity 111 of the quartz tube 11 can be discharged. The substance inside the discharge cavity 111 of the quartz tube 11 is required to be electrically conductive and have a resistance of 1-100Ω. If the resistance is too low, it will lead to considerable discharge current to damage the capacitor bank 22, and if the resistance is too high, it will lead to the failure of generating enough heat and even unsuccessful discharge.

In an embodiment, in step (S2), the first electrical discharge machining is performed as follows. The polyurethane sponge-carbon black combination is loaded in the discharge cavity 111 of the quartz tube 11. After filled with the polyurethane sponge-carbon black combination, the discharge cavity 111 is clamped with the electrode 12, and installed in the discharge chamber 1. The vacuum pump 4 is turned on to vacuumize the discharge chamber 1 (below 5 Pa), and then the air feeding device 5 is turned on to fed the process gas. The process gas used herein is argon. The steps of the second electrical discharge machining are basically the same as those of the first electrical discharge machining except that in the second electrical discharge machining, the vacuum pump 4 does not work; the air feeding device does not need to be turned on to feed the process gas; and the processing atmosphere is air.

In an embodiment, the discharge machining lasts for no more than 5 seconds, and is accompanied by white flash throughout. The phenomenon indicates that the sufficient carbonization, and the graphene exfoliation temperature (i.e., 3000 K or more) have been generated during the discharge process. If the discharge time is too long, it is necessary to perform discharge again under the same parameters till the start-to-finish time of the discharge is within 5 seconds. The shape and size of the quartz tube 11 can be adjusted according to the desired phase change material shape, and can be in a shape of cylinder, cuboid or circular truncated cone.

In order to facilitate the understanding of the application provided herein, the application will be described in detail below. The application can be implemented in many different forms and is not limited to the embodiments described herein. These embodiments are merely intended to make the disclosure better understood.

Unless otherwise specified, the techniques or conditions mentioned in the embodiments are carried out as described in the literature in the art or as recommended by the manufacture. Unless otherwise specified, the agents or instruments used herein are all commercially available.

Embodiment 1

Provided herein is a method for preparing a graphene-based polyethylene glycol phase change material, which includes the following steps.

(S1) Carbon black is dispersed in deionized water to form a carbon black dispersion with a concentration of 3 mg/mL. Polyurethane sponge is immersed in the carbon black dispersion, and then taken out and dried at 60° C. for 60 min to obtain a polyurethane sponge-carbon black combination.

(S2) The polyurethane sponge-carbon black combination is subjected to a first electrical discharge machining. Specifically, the polyurethane sponge-carbon black combination is placed in the discharge cavity 111 of the quartz tube 11. After filled with the polyurethane sponge-carbon black combination, the discharge cavity 111 is clamped with the electrode 12, and installed in the discharge chamber 1. The vacuum pump 4 is turned on to vacuumize the discharge chamber 1 (below 5 Pa), and then the air feeding device 5 is turned on to feed the argon for the first electrical discharge machining, where the first electrical discharge machining is performed at a discharge voltage of 240 V and a discharge capacitance of 240 mF to obtain a first intermediate.

(S3) The first intermediate, polyethylene glycol, and MgO are ultrasonically mixed to obtain a second intermediate.

(S31) MgO and polyethylene glycol are ultrasonically mixed for 15 min to obtain a mixture of MgO and polyethylene glycol, where a weight ratio of MgO to polyethylene glycol is 1:8.

(S32) The first intermediate is injected with the mixture of MgO and polyethylene glycol, and then ultrasonically mixed for 10 min to obtain the second intermediate, where a weight ratio of the mixture of MgO and polyethylene glycol to the first intermediate is 1:0.4.

(S4) The second intermediate is subjected to a second electrical discharge machining. Specifically, the second intermediate is loaded to fill the discharge cavity 111 of the quartz tube 11. After clamped with the electrode 12, the discharge cavity 111 of the quartz tube 11 is installed in the discharge chamber 1 for the second electrical discharge machining, where the second electrical discharge machining is performed at a discharge voltage of 240 V and a discharge capacitance of 240 mF to obtain a third intermediate.

(S5) The third intermediate is subjected to acid washing using a 2 mol/L dilute hydrochloric acid and dried at 130° C. to obtain a fourth intermediate.

(S6) The fourth intermediate is injected with polyethylene glycol, stirred in a mold and dried to a constant weight in a vacuum oven at 60° C. to obtain the graphene-based polyethylene glycol phase change material, where a weight ratio of the fourth intermediate to polyethylene glycol is 1:10.

Embodiment 2

Provided herein is a method for preparing a graphene-based polyethylene glycol phase change material, which includes the following steps.

(S1) Carbon black is dispersed in deionized water to form a carbon black dispersion with a carbon black concentration of 1 mg/mL. Polyurethane sponge is immersed in the carbon black dispersion, and then taken out and dried at 60° C. for 60 min to obtain a polyurethane sponge-carbon black combination.

(S2) The polyurethane sponge-carbon black combination is subjected to a first electrical discharge machining. Specifically, the polyurethane sponge-carbon black combination is placed in the discharge cavity 111 of the quartz tube 11. After filled with the polyurethane sponge-carbon black combination, the discharge cavity 111 is clamped with the electrode 12, and installed in the discharge chamber 1. The vacuum pump 4 is turned on to vacuumize the discharge chamber 1 (below 5 Pa), and then the air feeding device 5 is turned on to feed the argon for the first electrical discharge machining, where the first electrical discharge machining is performed at a discharge voltage of 240 V and a discharge capacitance of 240 mF to obtain a first intermediate.

(S3) The first intermediate, polyethylene glycol, and MgO are ultrasonically mixed to obtain a second intermediate.

(S31) MgO and polyethylene glycol are ultrasonically mixed for 15 min to obtain a mixture of MgO and polyethylene glycol, where a weight ratio of MgO to polyethylene glycol of is 1:5.

(S32) The first intermediate is injected with the mixture of MgO and polyethylene glycol, and then ultrasonically mixed for 10 min to obtain the second intermediate, where a weight ratio of the mixture of MgO and polyethylene glycol to the first intermediate is 1:0.3.

(S4) The second intermediate is subjected to a second electrical discharge machining. Specifically, the second intermediate is loaded to fill the discharge cavity 111 of the quartz tube 11. After clamped with the electrode 12, the discharge cavity 111 of the quartz tube 11 is installed in the discharge chamber 1 for the second electrical discharge machining, where the second electrical discharge machining is performed at a discharge voltage of 240 V and a discharge capacitance of 240 mF to obtain a third intermediate.

(S5) The third intermediate is subjected to acid washing using a 2 mol/L dilute hydrochloric acid and dried at 130° C. to obtain a fourth intermediate.

(S6) The fourth intermediate is injected with polyethylene glycol, stirred in a mold and dried to a constant weight in a vacuum oven at 60° C. to obtain the graphene-based polyethylene glycol phase change material, where a weight ratio of the fourth intermediate to polyethylene glycol is 1:5.

Embodiment 3

Provided herein is a method for preparing a graphene-based polyethylene glycol phase change material, which includes the following steps.

(S1) Carbon black is dispersed in deionized water to form a carbon black dispersion with a carbon black concentration of 5 mg/mL. Polyurethane sponge is immersed in the carbon black dispersion, and then taken out and dried at 60° C. for 60 min to obtain a polyurethane sponge-carbon black combination.

(S2) The polyurethane sponge-carbon black combination is subjected to a first electrical discharge machining. Specifically, the polyurethane sponge-carbon black combination is placed in the discharge cavity 111 of the quartz tube 11. After filled with the polyurethane sponge-carbon black combination, the discharge cavity 111 is clamped with the electrode 12, and installed in the discharge chamber 1. The vacuum pump 4 is turned on to vacuumize the discharge chamber 1 (below 5 Pa), and then the air feeding device 5 is turned on to feed the argon for the first electrical discharge machining, where the first electrical discharge machining is performed at a discharge voltage of 240 V and a discharge capacitance of 240 mF to obtain a first intermediate.

(S3) The first intermediate, polyethylene glycol, and MgO are ultrasonically mixed to obtain a second intermediate.

(S31) MgO and polyethylene glycol are ultrasonically mixed for 15 min to obtain a mixture of MgO and polyethylene glycol, where a weight ratio of MgO and polyethylene glycol is 1:10

(S32) The first intermediate is injected with the mixture of MgO and polyethylene glycol, and then ultrasonically mixed for 10 min to obtain the second intermediate, where a weight ratio of the mixture of MgO and polyethylene glycol to the first intermediate is 1:0.5.

(S4) The second intermediate is subjected to a second electrical discharge machining. Specifically, the second intermediate is loaded to fill the discharge cavity 111 of the quartz tube 11. After clamped with the electrode 12, the discharge cavity 111 of the quartz tube 11 is installed in the discharge chamber 1 for the second electrical discharge machining, where the second electrical discharge machining is performed at a discharge voltage of 240 V and a discharge capacitance of 240 mF to obtain a third intermediate.

(S5) The third intermediate is subjected to acid washing using a 2 mol/L dilute hydrochloric acid and dried at 130° C. to obtain a fourth intermediate.

(S6) The fourth intermediate is injected with polyethylene glycol, stirred in a mold and dried to a constant weight in a vacuum oven at 60° C. to obtain the graphene-based polyethylene glycol phase change material, where a weight ratio of the fourth intermediate to polyethylene glycol is 1:15.

Embodiment 4

Provided herein is a method for preparing a graphene-based polyethylene glycol phase change material, which includes the following steps.

(S1) Carbon black is dispersed in deionized water to form a carbon black dispersion with a carbon black concentration of 3 mg/mL. Polyurethane sponge is immersed in the carbon black dispersion, and then taken out and dried at 60° C. for 60 min to obtain a polyurethane sponge-carbon black combination.

(S2) The polyurethane sponge-carbon black combination is subjected to a first electrical discharge machining. Specifically, the polyurethane sponge-carbon black combination is placed in the discharge cavity 111 of the quartz tube 11. After filled with the polyurethane sponge-carbon black combination, the discharge cavity 111 is clamped with the electrode 12, and installed in the discharge chamber 1. The vacuum pump 4 is turned on to vacuumize the discharge chamber 1 (below 5 Pa), and then the air feeding device 5 is turned on to feed the argon for the first electrical discharge machining, where the first electrical discharge machining is performed at a discharge voltage of 108 V and a discharge capacitance of 108 mF to obtain a first intermediate.

(S3) The first intermediate, polyethylene glycol, and MgO are ultrasonically mixed to obtain a second intermediate.

(S31) MgO and polyethylene glycol are ultrasonically mixed for 15 min to obtain a mixture of MgO and polyethylene glycol, where a weight ratio of MgO to polyethylene glycol is 1:8.

(S32) The first intermediate is injected with the mixture of MgO and polyethylene glycol, and then ultrasonically mixed for 10 min to obtain the second intermediate, where a weight ratio of the mixture of MgO and polyethylene glycol and the first intermediate is 1:0.4.

(S4) The second intermediate is subjected to a second electrical discharge machining. Specifically, the second intermediate is loaded to fill the discharge cavity 111 of the quartz tube 11. After clamped with the electrode 12, the discharge cavity 111 of the quartz tube 11 is installed in the discharge chamber 1 for the second electrical discharge machining, where the second electrical discharge machining is performed at a discharge voltage of 216 V and a discharge capacitance of 216 mF, so as to obtain a third intermediate.

(S5) The third intermediate is subjected to acid washing using a 2 mol/L dilute hydrochloric acid and dried at 130° C. to obtain a fourth intermediate.

(S6) The fourth intermediate is injected with polyethylene glycol, stirred in a mold and dried to a constant weight in a vacuum oven at 60° C. to obtain the graphene-based polyethylene glycol phase change material, where a weight ratio of the fourth intermediate to polyethylene glycol is 1:10.

Embodiment 5

Provided herein is a method for preparing a graphene-based polyethylene glycol phase change material, which includes the following steps.

(S1) Carbon black is dispersed in deionized water to form a carbon black dispersion with a carbon black concentration of 3 mg/mL. Polyurethane sponge is immersed in the carbon black dispersion, and then taken out and dried at 60° C. for 60 min to obtain a polyurethane sponge-carbon black combination.

(S2) The polyurethane sponge-carbon black combination is subjected to a first electrical discharge machining. Specifically, the polyurethane sponge-carbon black combination is placed in the discharge cavity 111 of the quartz tube 11. After filled with the polyurethane sponge-carbon black combination, the discharge cavity 111 is clamped with the electrode 12, and installed in the discharge chamber 1. The vacuum pump 4 is turned on to vacuumize the discharge chamber 1 (below 5 Pa), and then the air feeding device 5 is turned on to feed the argon, where the first electrical discharge machining is performed at a discharge voltage of 288 V and a discharge capacitance of 288 mF to obtain a first intermediate.

(S3) The first intermediate, polyethylene glycol, and MgO are ultrasonically mixed to obtain a second intermediate.

(S31) MgO and polyethylene glycol are ultrasonically mixed for 15 min to obtain a mixture of MgO and polyethylene glycol, where a weight ratio of MgO and polyethylene glycol is 1:8.

(S32) The first intermediate is injected with the mixture of MgO and polyethylene glycol, and then ultrasonically mixed for 10 min to obtain the second intermediate, where a weight ratio of the mixture of MgO and polyethylene glycol to the first intermediate is 1:0.4.

(S4) The second intermediate is subjected to a second electrical discharge machining. Specifically, the second intermediate is loaded to fill the discharge cavity 111 of the quartz tube 11. After clamped with the electrode 12, the discharge cavity 111 of the quartz tube 11 is installed in the discharge chamber 1 for the second electrical discharge machining, where the second electrical discharge machining is performed at a discharge voltage of 360 V and a discharge capacitance of 360 mF to obtain a third intermediate.

(S5) The third intermediate is subjected to acid washing using a 2 mol/L dilute hydrochloric acid and dried at 130° C. to obtain a fourth intermediate.

(S6) The fourth intermediate is injected with polyethylene glycol, stirred in a mold and dried to a constant weight in a vacuum oven at 60° C. to obtain the graphene-based polyethylene glycol phase change material, where a weight ratio of the fourth intermediate to polyethylene glycol is 1:10.

Comparative Embodiment 1

The preparation provided herein is basically the same as that in Embodiment 1 except that in this embodiment, in step (S1), the concentration of the carbon black dispersion is 0.5 mg/mL.

Comparative Embodiment 2

The preparation provided herein is basically the same as that in Embodiment 1 except that in this embodiment, in step (S1), the carbon black concentration in the carbon black dispersion is 6 mg/mL.

Comparative Embodiment 3

The preparation provided herein is basically the same as that in Embodiment 1 except that in this embodiment, in step (S31), the weight ratio of MgO and polyethylene glycol is 0.5:8.

Comparative Embodiment 4

The preparation provided herein is basically the same as that in Embodiment 1 except that in this embodiment, in step (S32), the weight ratio of the mixture of MgO and polyethylene glycol and the first intermediate is 1:0.2.

Comparative Embodiment 5

The preparation provided herein is basically the same as that in Embodiment 1 except that in this embodiment, in step (S32), the weight ratio of the mixture of MgO and polyethylene glycol and the first intermediate is 1:0.6.

Comparative Embodiment 6

The preparation provided herein is basically the same as that in Embodiment 1 except that in this embodiment, in step (S6), the weight ratio of the fourth intermediate and polyethylene glycol is 1:4.

Comparative Embodiment 7

The preparation provided herein is basically the same as that in Embodiment 1 except that in this embodiment, in step (S6), the weight ratio of the fourth intermediate and polyethylene glycol is 1:16.

The graphene-based polyethylene glycol phase change materials prepared in Embodiments 1-5 and Comparative Embodiments 1-7 are tested for the phase change enthalpy.

The phase change enthalpy (enthalpy of fusion and enthalpy of crystallization) is a key factor affecting the performance of phase change materials, and can be used as an index to evaluate the thermal energy storage capacity of phase change materials. Specifically, a differential scanning calorimeter (DSC method, DISCOVERY DSC) is adopted to measure the enthalpy of fusion and enthalpy of crystallization of polyethylene glycol in the graphene-based polyethylene glycol phase change material. The test results are shown in Table 1.

TABLE 1

Enthalpies of fusion and crystallization of phase change materials in Embodiments 1-5 and Comparative embodiments 1-6

| | Test items | |
| --- | --- | --- |
| Samples | Enthalpy of fusion (J/g) | Enthalpy of crystallization (J/g) |
| Pure polyethylene glycol | 170.5 | 158.6 |
| Embodiment 1 | 175.1 | 166.3 |
| Embodiment 2 | 174.6 | 165.6 |
| Embodiment 3 | 173.9 | 163.3 |
| Embodiment 4 | 174.1 | 165.3 |
| Embodiment 5 | 174.2 | 163.8 |
| Comparative Embodiment 1 | 172.2 | 160.3 |
| Comparative Embodiment 2 | 172.5 | 160.8 |
| Comparative Embodiment 3 | 171.7 | 159.9 |
| Comparative Embodiment 4 | 172.5 | 160.8 |
| Comparative Embodiment 5 | 173.1 | 161.3 |
| Comparative Embodiment 6 | 172.4 | 160.5 |
| Comparative Embodiment 7 | 172.3 | 159.9 |

It can be seen from the tests results that the enthalpy of fusion of pure polyethylene glycol is 170.5 J/g, and the enthalpy of crystallization of pure polyethylene glycol is 158.6 J/g. However, the enthalpy of fusion and enthalpy of crystallization of polyethylene glycol in the graphene-based polyethylene glycol phase change material prepared in each of Embodiments 1-5 are higher than those of pure polyethylene glycol. The strong interface between the graphene framework and polyethylene glycol is built by means of the instantaneous electrical discharge machining. The introduction of the elastic porous three-dimensional graphene framework can commendably improve the phase change enthalpy of polyethylene glycol.

The carbon black concentration in the carbon black dispersion in Comparative Embodiment 1 is too low, resulting in an insufficiency attachment of carbon black on the polyurethane sponge. The carbon black concentration in the carbon black dispersion in Comparative Embodiment 2 is too high, resulting in an excessive attachment of carbon black, further affecting the conversion of the polyurethane sponge into graphene in the first electrical discharge machining. The enthalpy of fusion and the enthalpy of crystallization of the prepared polyethylene glycol in the graphene-based polyethylene glycol phase change material are both lower than those in Embodiment 1.

Considering that in Comparative Embodiment 3 the amount of MgO is small in step (S31), the catalytic effect that MgO catalyzes the carbonization of polyethylene glycol and the carbonized product is peeled to form graphene nanosheets is insufficient in the second electrical discharge machining, leading to an low phase change enthalpy of prepared polyethylene glycol in the graphene-based polyethylene glycol phase change material.

Considering that in Comparative Embodiment 4 the amount of the first intermediate is insufficient in step (S32), the electrical conductivity in the second electrical discharge machining is insufficient. Considering that in Comparative Embodiment 5 the first intermediate is excessive in step (S32), the three-dimensional framework is subjected to excessive deformation by excessive compression in the second electrical discharge machining, affecting the formation of the final elastic porous structure, leading to an low phase change enthalpy of prepared polyethylene glycol in the graphene-based polyethylene glycol phase change material.

In Comparative Embodiment 6, the amount of polyethylene glycol is insufficient in step (S6), and in Comparative Embodiment 7, polyethylene glycol is excessive in step (S6), both of which will lead to an low phase change enthalpy of prepared polyethylene glycol in the graphene-based polyethylene glycol phase change material, and obtain a phase change material with undesirable latent heat storage capacity at last.

The above are only some embodiments of this disclosure, which are not intended to limit this disclosure. It should be noted that any modifications and improvements made by those of ordinary skill in the art without departing from the spirit of the application should fall within the scope of the application defined by the appended claims.

What is claimed is:

1. A method for preparing a graphene-based polyethylene glycol phase change material, comprising:
   (S1) dispersing carbon black in deionized water to form a carbon black dispersion; immersing polyurethane sponge in the carbon black dispersion; and taking out the polyurethane sponge followed by drying to obtain a polyurethane sponge-carbon black combination;
   (S2) subjecting the polyurethane sponge-carbon black combination to a first electrical discharge machining to obtain a first intermediate;
   (S3) ultrasonically mixing the first intermediate, polyethylene glycol, and MgO to obtain a second intermediate;
   (S4) subjecting the second intermediate to a second electrical discharge machining to obtain a third intermediate;
   (S5) subjecting the third intermediate to acid washing to obtain a fourth intermediate, and drying the fourth intermediate;
   (S6) injecting polyethylene glycol into the fourth intermediate followed by stirring in a mold and drying to prepare the graphene-based polyethylene glycol phase change material;
   in step (S1), a concentration of the carbon black in the carbon black dispersion is 1-5 mg/mL;

in step (S2), the first electrical discharge machining is performed in an argon atmosphere at a discharge voltage of 100-300 V and a discharge capacitance of 100-300 mF;

in step (S3), an ultrasonic mixing of the first intermediate, polyethylene glycol, and MgO is performed through steps of:

(S31) ultrasonically mixing MgO and polyethylene glycol for 5-20 min to obtain a mixture of MgO and polyethylene glycol; and (S32) injecting the mixture of MgO and polyethylene glycol into the first intermediate followed by ultrasonic mixing for 5-10 min to obtain the second intermediate;

in step (S31), a weight ratio of MgO to polyethylene glycol is 1:(5-10);

in step (S32), a weight ratio of the mixture of MgO and polyethylene glycol to the first intermediate is 1:(0.3-0.5); and in step (S4), the second electrical discharge machining is performed in an air atmosphere at a discharge voltage of 200-400 V and a discharge capacitance of 150-360 mF.

2. The method of claim 1, wherein in step (S5), the acid washing of the third intermediate is performed using a dilute hydrochloric acid with a concentration of 2-2.5 mol/L.

3. The method of claim 1, wherein in step (S6), the drying is performed through a step of:

drying the fourth intermediate injected with polyethylene glycol to a constant weight at 50-70° C. in a vacuum oven.

4. The method of claim 1, wherein in step (S6), a weight ratio of the fourth intermediate to polyethylene glycol is 1:(5-15).

* * * * *